United States Patent
Chen et al.

(10) Patent No.: US 9,122,090 B2
(45) Date of Patent: Sep. 1, 2015

(54) TRANSPARENT DISPLAY DEVICE

(71) Applicant: CHUNGHWA PICTURE TUBES, LTD., Taoyuan (TW)

(72) Inventors: Jian-Hua Chen, Changhua County (TW); Chun-Wei Su, New Taipei (TW)

(73) Assignee: Chunghwa Picture Tubes, Ltd., Taoyuan (TW)

( * ) Notice: Subject to any disclaimer, the term of this patent is extended or adjusted under 35 U.S.C. 154(b) by 30 days.

(21) Appl. No.: 14/109,934

(22) Filed: Dec. 17, 2013

(65) Prior Publication Data

US 2015/0116636 A1 Apr. 30, 2015

(30) Foreign Application Priority Data

Oct. 24, 2013 (TW) .............................. 102138496 A

(51) Int. Cl.
*G02F 1/1333* (2006.01)
*G02F 1/1335* (2006.01)
*G02F 1/1334* (2006.01)

(52) U.S. Cl.
CPC ........ *G02F 1/133514* (2013.01); *G02F 1/1334* (2013.01)

(58) Field of Classification Search
CPC .......................... G02F 1/1334; G02F 1/133112
USPC ............................................. 349/86, 88, 106
See application file for complete search history.

(56) References Cited

U.S. PATENT DOCUMENTS

| | | | |
|---|---|---|---|
| 6,853,416 B2 * | 2/2005 | Hamamoto et al. | 349/106 |
| 2005/0237473 A1 * | 10/2005 | Stephenson et al. | 349/175 |
| 2008/0036951 A1 * | 2/2008 | Tsai et al. | 349/110 |
| 2008/0074369 A1 * | 3/2008 | Hsu | 345/88 |
| 2008/0239198 A1 * | 10/2008 | Kim et al. | 349/62 |
| 2010/0208172 A1 * | 8/2010 | Jang et al. | 349/71 |
| 2011/0261294 A1 | 10/2011 | Jang et al. | |
| 2012/0001947 A1 * | 1/2012 | Chu-Ke et al. | 345/690 |
| 2012/0008075 A1 * | 1/2012 | Kwon et al. | 349/108 |
| 2012/0120337 A1 * | 5/2012 | Ji et al. | 349/39 |
| 2013/0162934 A1 * | 6/2013 | Hirayama et al. | 349/69 |
| 2013/0258639 A1 * | 10/2013 | Hu et al. | 362/84 |
| 2013/0329167 A1 * | 12/2013 | Iwanami et al. | 349/86 |

FOREIGN PATENT DOCUMENTS

| | | | | |
|---|---|---|---|---|
| JP | 2004-126045 | * | 4/2004 | ............ G02F 1/1335 |
| JP | 2006276089 A | | 10/2006 | |
| TW | 200739267 A | | 10/2007 | |
| TW | 200816126 | | 4/2008 | |
| TW | 201201189 | | 1/2012 | |
| TW | I375074 B | | 10/2012 | |

* cited by examiner

*Primary Examiner* — Sang V Nguyen
(74) *Attorney, Agent, or Firm* — CKC & Partners Co., Ltd.

(57) ABSTRACT

A transparent display device includes a color filter substrate, a driving substrate and a polymer-dispersed liquid crystal (PDLC) layer. The color filter substrate includes a substrate, a light shielding structure and a plurality of color filter patterns. The light shielding structure is disposed on the substrate to define a plurality of sub-pixel regions and a blank sub-pixel region of the substrate. The color filter patterns respectively cover the sub-pixel regions of the substrate, but the blank sub-pixel region is not covered by the color filter patterns. The driving substrate corresponds to the color filter substrate. The PDLC layer is interposed between the color filter substrate and the driving substrate.

8 Claims, 5 Drawing Sheets

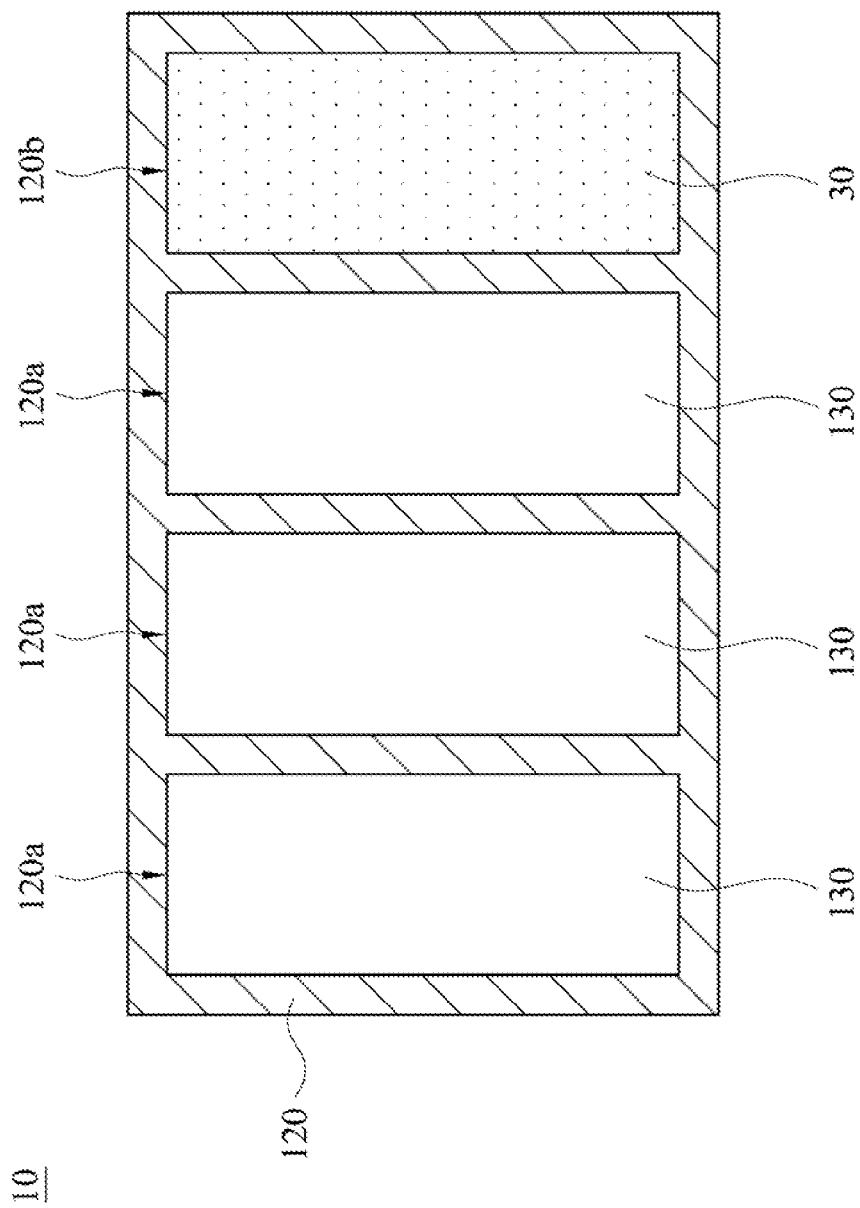

TRANSPARENT DISPLAY DEVICE

RELATED APPLICATIONS

This application claims priority to Taiwanese Application Serial Number 102138496, filed Oct. 24, 2013, which is herein incorporated by reference.

BACKGROUND

1. Field of Invention

The present invention relates to a transparent display device. More particularly, the present invention relates to a transparent display device including a color filter substrate, a driving substrate and a polymer dispersed liquid crystal (PDLC) layer.

2. Description of Related Art

Generally, a liquid crystal display (LCD) device may be generally classified into a transmissive LCD device, a reflective LCD device and a transflective LCD device. With the increasing of display device applications, transparent display devices have gradually been developed. A viewer may see not only an image displayed by the transparent display device but also background information behind the transparent display device, and thus heavy sense of the visual is not generated. Such transparent display device may be used in a vehicle windshield or a showcase.

The transparent display device generally includes a LCD panel, a polarizer plate and a backlight module. However, the polarizer plate makes transmittance of the transparent display device be significantly declined. In another aspect, the LCD panel includes a color filter substrate, a driving substrate and a liquid crystal layer, in which each color filter of the color filter substrate has a certain thickness and significantly absorbs light, such that an amount of light out is decreased so as to decrease transmittance of the transparent display device. In view of the above, how to enhance transmittance of a transparent display device becomes an important issue.

SUMMARY

An objective of the present invention is to provide a transparent display device including a color filter substrate, a driving substrate and a polymer dispersed liquid crystal (PDLC) layer. A plurality of blank sub-pixel regions are disposed on the color filter substrate. States of the PDLC layer corresponding to the blank sub-pixel regions may be respectively controlled to increase transmittance and brightness or to enhance performance of white screen.

An aspect of the present invention provides the transparent display device including the color filter substrate, the driving substrate and the PDLC layer. The color filter substrate includes a substrate, a light shielding structure and a plurality of color filter patterns. The light shielding structure is disposed on the substrate to define a plurality of sub-pixel regions and a blank sub-pixel region of the substrate. The color filter patterns respectively cover the sub-pixel regions of the substrate, but the blank sub-pixel region is not covered by the color filter patterns. The driving substrate corresponds to the color filter substrate. The PDLC layer is interposed between the color filter substrate and the driving substrate.

According to one embodiment of the present invention, the color filter patterns and the PDLC layer corresponding to the blank sub-pixel region constitute a pixel.

According to one embodiment of the present invention, the color filter substrate further includes a common electrode covering the color filter patterns and the blank sub-pixel region.

According to one embodiment of the present invention, the driving substrate includes a plurality of sub-pixel electrodes respectively corresponding to the sub-pixel regions and the blank sub-pixel region of the color filter substrate.

According to one embodiment of the present invention, the PDLC layer is interposed between the common electrode and the sub-pixel electrodes.

According to one embodiment of the present invention, the color filter patterns respectively are a red filter pattern, a green filter pattern and a blue filter pattern.

According to one embodiment of the present invention, the PDLC layer corresponding to the blank sub-pixel region has a thickness greater than a thickness of the PDLC layer corresponding to the color filter patterns.

According to one embodiment of the present invention, the blank sub-pixel region has an area same as an area of each of the sub-pixel regions.

According to one embodiment of the present invention, the color filter substrate excludes an orientation structure layer.

According to one embodiment of the present invention, the transparent display device excludes a polarizer plate.

Advantages of the present invention are that transmittance and brightness may be increased or performance of white screen may be enhanced by controlling states of the PDLC layer corresponding to the blank sub-pixel regions. Accordingly, the transparent display device may exhibit high transmittance, brightness and contrast, and thus to exhibit more complete color performance.

BRIEF DESCRIPTION OF THE DRAWINGS

The invention can be more fully understood by reading the following detailed description of the embodiment, with reference made to the accompanying drawings as follows:

FIG. 2 is a top view of a color filter substrate according to one embodiment of the present invention.

DETAILED DESCRIPTION

Figure 1:
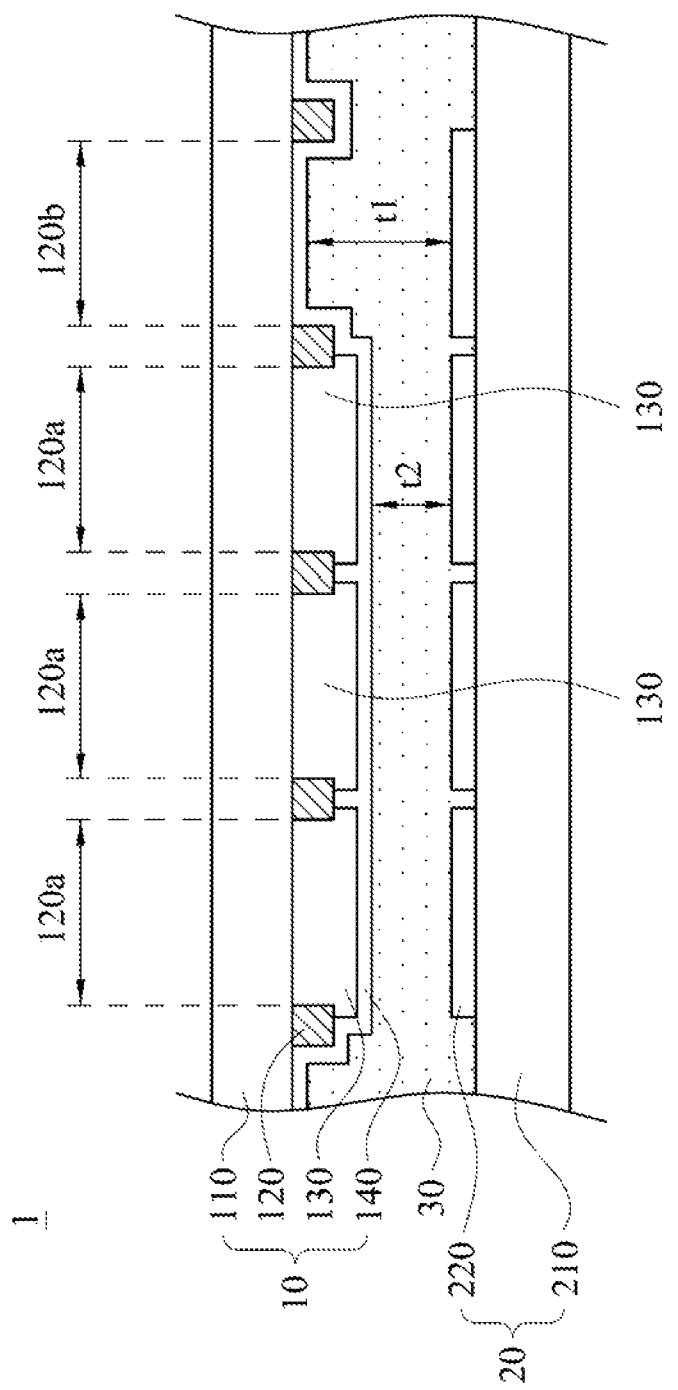
FIG. 1 is a cross-sectional view of a transparent display device according to one embodiment of the present invention.

FIG. 1 is a cross-sectional view of a transparent display device 1 according to one embodiment of the present invention. The transparent display device 1 includes a color filter substrate 10, a driving substrate 20 and a polymer dispersed liquid crystal (PDLC) layer 30.

The color filter substrate 10 includes a substrate 110, a light shielding structure 120 and a plurality of color filter patterns 130. The substrate 110 may be a glass substrate, a quartz substrate or a flexible plastic substrate. FIG. 2 is a top view of a color filter substrate 10 according to one embodiment of the present invention. As shown in FIGS. 1-2, the light shielding structure 120 is disposed on the substrate 110 to define a plurality of sub-pixel regions 120a and a blank sub-pixel region 120b of the substrate 110. The light shielding structure 120 may be made of chromium or black resin. For example, a light shielding material may be formed on the substrate 110, and photolithographic and etch processes may then be performed on the light shielding material to form the light shielding structure 120 to define the sub-pixel regions 120a and the blank sub-pixel region 120b.

The color filter patterns 130 respectively cover the sub-pixel regions 120a of the substrate 110. The color filter patterns 130 may be formed by photolithographic processes or printing processes. For instance, photolithographic processes or printing processes may be performed on three color photoresists with various colors to form the three color filter patterns 130. In one embodiment, the three color filter patterns 130 respectively are a red filter pattern, a green filter pattern and a blue filter pattern. The three color filter patterns 130 are given as an example, but the present invention is not limited thereto. The amount of the color filter patterns 130 may be greater than three.

It is noteworthy that the blank sub-pixel region 120b is not covered by the color filter patterns 130. Therefore, as shown in FIG. 1, a thickness t1 of the PDLC layer 30 corresponding to the blank sub-pixel region 120b is greater than a thickness t2 of the PDLC layer 30 corresponding to the color filter patterns 130. "The PDLC layer 30 corresponding to the blank sub-pixel region 120b" refers to a portion of the PDLC layer 30 where a vertical projection (along a thickness direction) of the blank sub-pixel region 120b on the PDLC layer 30. "The PDLC layer 30 corresponding to the color filter patterns 130" refers to portions of the PDLC layer 30 where vertical projections (along a thickness direction) of the color filter patterns 130 on the PDLC layer 30. The PDLC layer 30 corresponding to the blank sub-pixel region 120b may be acted as a blank sub-pixel. The color filter patterns 130 and the PDLC layer 30 corresponding to the blank sub-pixel region 120b may constitute a pixel. In other words, the sub-pixel regions 120a and the blank sub-pixel region 120b constitute a pixel region. When the PDLC layer 30 corresponding to the blank sub-pixel region 120b is in a transparent state, transmittance and an amount of light out may be increased so as to increase brightness; when the PDLC layer 30 corresponding to the blank sub-pixel region 120b is in an opaque (or scattering) state, performance of white screen is enhanced. The reason will be described in detail in FIGS. 3A-3C. The shape, area and arrangement of the sub-pixel regions 120a and the blank sub-pixel region 120b are not limited herein. For example, an area ratio of the sub-pixel regions 120a to the blank sub-pixel region 120b may be determined based on the needs of transmittance and brightness. Therefore, FIG. 2 just shows one of the embodiments and the present invention is not limited thereto. In the current embodiment, an area of the blank sub-pixel region 120b is same as an area of each sub-pixel region 120a.

In the embodiment, the color filter substrate 10 further includes a common electrode 140 covering the color filter patterns 130 and the blank sub-pixel region 120b, as shown in FIG. 1. The common electrode 140 may be made of a transparent conductive material, such as indium tin oxide (ITO), aluminum zinc oxide (AZO), aluminum tin oxide (ATO), gallium zinc oxide (GZO) and indium titanium oxide (ITiO). The common electrode 140 may be fabricated by a physical or chemical vapor deposition method.

The driving substrate 20 corresponds to the color filter substrate 10. The driving substrate 20 corresponding to the color filter substrate 10" refers to that a vertical projection of the driving substrate 20 on the PDLC layer 30 is overlapped with a vertical projection of the color filter substrate 10 on the PDLC layer 30. In one embodiment, the driving substrate 20 is parallel to the color filter substrate 10. The driving substrate 20 may be a thin film transistor array substrate 210, which may include a substrate (not shown), thin film transistors (not shown), scan lines (not shown) and data lines (not shown) disposed on the substrate. The scan lines and the data lines may be intersected to define a plurality of sub-pixel regions (not shown) of the driving substrate 20. The sub-pixel regions of the driving substrate 20 are respectively corresponded to the sub-pixel regions 120a and the blank sub-pixel region 120b of the color filter substrate 10. In order to independently drive the PDLC layer 30 corresponding to each of the sub-pixel regions 120a and the blank sub-pixel region 120b, in one embodiment, the driving substrate 20 includes a plurality of sub-pixel electrodes 220 respectively on the sub-pixel regions of the thin film transistor array substrate 210. The sub-pixel electrodes 220 are respectively corresponded to the sub-pixel regions 120a and the blank sub-pixel region 120b of the color filter substrate 10. "The sub-pixel electrodes 220 respectively corresponded to the sub-pixel regions 120a and the blank sub-pixel region 120b of the color filter substrate 10" refers to that a vertical projection of each sub-pixel electrode 220 on the color filter substrate 10 is overlapped with one of the sub-pixel regions 120a or the blank sub-pixel region 120b. Accordingly, the PDLC layer 30 corresponding to each of the sub-pixel regions 120a and the blank sub-pixel region 120b may be independently controlled by one of the sub-pixel electrodes 220. The material of the sub-pixel electrodes 220 may be referred to those exemplified for the common electrode 140. For instance, a transparent conductive material may be formed covering the thin film transistors, and photolithographic and etch processes may then be performed on the transparent conductive material to form the sub-pixel electrodes 220.

The PDLC layer 30 is interposed between the color filter substrate 10 and the driving substrate 20. That is, the PDLC layer 30 is interposed between the common electrode 140 and the sub-pixel electrodes 220. The PDLC layer 30 may be prepared by nematic liquid crystals, photopolymerizable materials and a photo initiator. The photopolymerizable materials may be unsaturated thiol ester monomers or oligomers, acrylic acid group-containing monomers or oligomers or epoxy group-containing monomers or oligomers, but not limited thereto. Specifically, the nematic liquid crystals, photopolymerizable materials and photo initiator may be premixed and then irradiated by UV light to form liquid crystal droplets. Liquid crystals in the liquid crystal droplet are orderly arranged when a voltage is applied, and thus light is able to penetrate the PDLC layer 30; liquid crystals in the liquid crystal droplet are random arranged when no voltage is applied, and thus light cannot penetrate the PDLC layer 30. Since the PDLC layer 30 is used in the transparent display device 1 rather than a general liquid crystal layer, there is no need for any polarizer plate and any orientation structure layer included by the color filter substrate 10. The transparent display device 1 may exhibit high transmittance since it excludes a polarizer plate. Also, manufacturing and material costs of the color filter substrate 10 may be saved since the transparent display device 1 excludes an orientation structure layer.

Figure 3A:
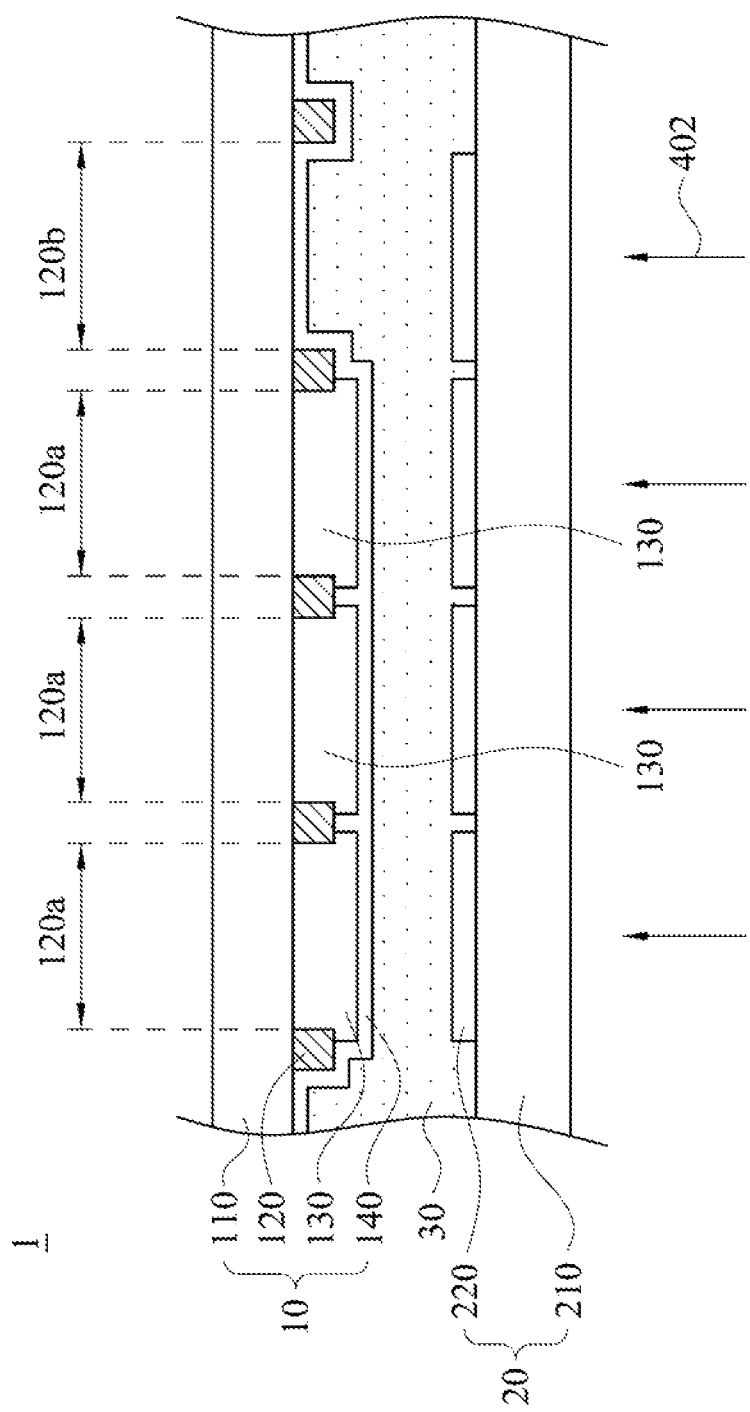
FIGS. 3A, 3B and 3C are cross-sectional views of a transparent display device, respectively when a voltage is not applied, applied on the entire PDLC layer and applied on portions of the PDLC layer according to one embodiment of the present invention.
Figure 3B:
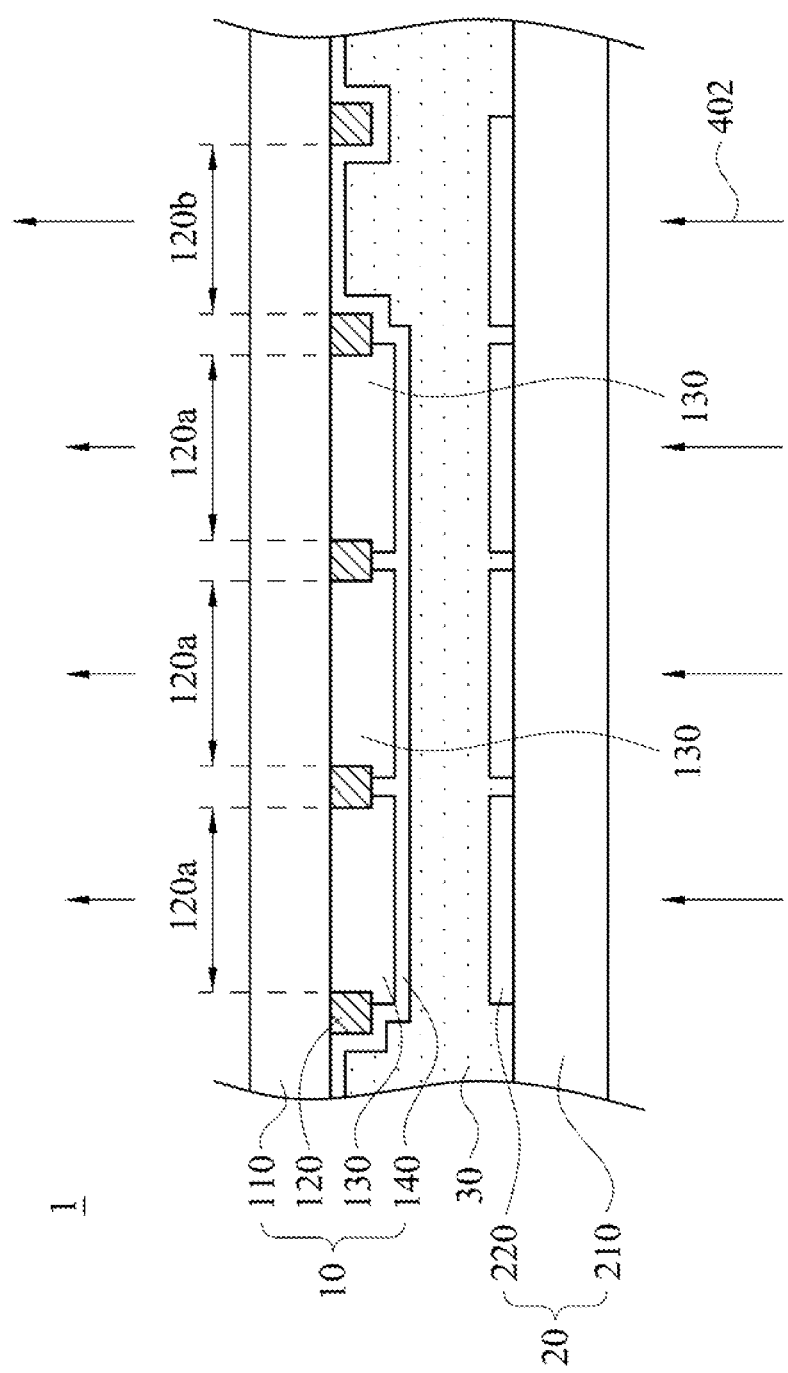
Figure 3C:
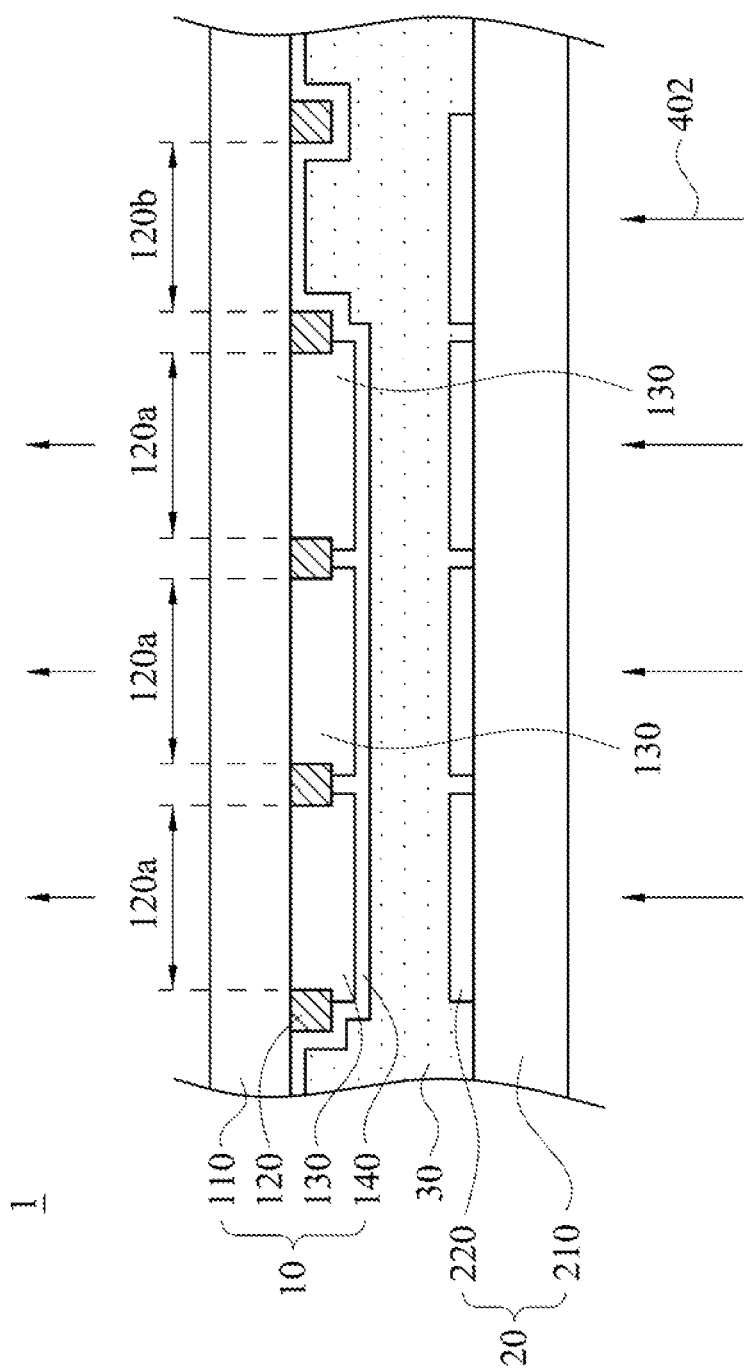

FIGS. 3A, 3B and 3C are cross-sectional views of a transparent display device 1, respectively when a voltage is not applied, applied on the entire PDLC layer and applied on portions of the PDLC layer according to one embodiment of the present invention. As shown in FIG. 3A, the entire PDLC layer 30 is in the opaque state, and ambient lights 402 cannot penetrate the PDLC layer 30, such that no image is formed.

As shown in FIG. 3B, the entire PDLC layer 30 is in the transparent state when the voltage is applied on the entire PDLC layer 30, and ambient lights 402 can penetrate the PDLC layer 30 and further pass through the color filter patterns 130 and the blank sub-pixel region 120b to display an image and let a viewer see background information. The color filter patterns 130 absorb light to decrease the amount of light out. However, transmittance of a pixel may be increased and the amount of light out thereof may still be compensated to increase image brightness since no color filter pattern 130 is disposed on the blank sub-pixel region 120b.

As shown in FIG. 3C, when the voltage is applied on the PDLC layer 30 corresponding to the sub-pixel regions 120a, ambient lights 402 can penetrate the color filter patterns 130 to display an image. No voltage is applied on the PDLC layer 30 corresponding to the blank sub-pixel region 120b, and thus it is in the opaque state. The PDLC layer 30 in the opaque state exhibits fog white color and has a function similar to a function of a white sub-pixel, such that it can be used to strengthen performance of white screen. As such, a contrast of the transparent display device 1 may be increased and color performance may also be more completely.

In summary, transmittance and brightness may be increased or performance of white screen may be enhanced by controlling the state of the PDLC layer corresponding to the blank sub-pixel region. Accordingly, the transparent display device may exhibit high transmittance, brightness and contrast. Further, it should understood that the transparent display device of the present invention may further include a backlight module (not shown) so as able to clearly display an image in weak ambient lights (e.g., at night or in a dark room).

It will be apparent to those ordinarily skilled in the art that various modifications and variations may be made to the structure of the present invention without departing from the scope or spirit of the invention. In view of the foregoing, it is intended that the present invention cover modifications and variations thereof provided they fall within the scope of the following claims.

What is claimed is:

1. A transparent display device, comprising:
    a color filter substrate, comprising:
        a substrate;
        a light shielding structure disposed on the substrate to define a plurality of sub-pixel regions and a blank sub-pixel region of the substrate; and
        a plurality of color filter patterns respectively covering the sub-pixel regions of the substrate, but the blank sub-pixel region is not covered by the color filter patterns; and
    a driving substrate corresponding to the color filter substrate; and
    a polymer dispersed liquid crystal (PDLC) layer interposed between the color filter substrate and the driving substrate, wherein the blank sub-pixel region accommodates a portion of the PDLC layer, and the color filter patterns and the portion of the PDLC layer constitute a pixel,
    the color filter substrate further comprises a common electrode including a portion covering the blank sub-pixel region, wherein the PDLC layer aligned with the portion has a thickness greater than a thickness of the PDLC layer aligned with the color filter patterns.

2. The transparent display device of claim 1, wherein the common electrode covers the color filter patterns.

3. The transparent display device of claim 2, wherein the driving substrate comprises a plurality of sub-pixel electrodes respectively corresponding to the sub-pixel regions and the blank sub-pixel region of the color filter substrate.

4. The transparent display device of claim 3, wherein the PDLC layer is interposed between the common electrode and the sub-pixel electrodes.

5. The transparent display device of claim 1, wherein the color filter patterns respectively are a red filter pattern, a green filter pattern and a blue filter pattern.

6. The transparent display device of claim 1, wherein the blank sub-pixel region has an area same as an area of each of the sub-pixel regions.

7. The transparent display device of claim 1, wherein the color filter substrate excludes an orientation structure layer.

8. The transparent display device of claim 1, wherein the transparent display device excludes a polarizer plate.

* * * * *